United States Patent
Kronawitter (10) Patent No.: US 12,529,680 B2
(45) Date of Patent: Jan. 20, 2026

(54) TESTING APPARATUS AND METHOD FOR TESTING CONTAINERS

(71) Applicant: Uhlmann Pac-Systeme GmbH & Co. KG, Laupheim (DE)

(72) Inventor: Michael Kronawitter, Laupheim (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 146 days.

(21) Appl. No.: 18/288,769

(22) PCT Filed: Apr. 25, 2022

(86) PCT No.: PCT/EP2022/060879
§ 371 (c)(1),
(2) Date: Oct. 27, 2023

(87) PCT Pub. No.: WO2022/229089
PCT Pub. Date: Nov. 3, 2022

(65) Prior Publication Data
US 2024/0201135 A1 Jun. 20, 2024

(30) Foreign Application Priority Data
Apr. 28, 2021 (EP) .................................. 21171017

(51) Int. Cl.
*G01N 27/72* (2006.01)
*B65B 3/00* (2006.01)
*B65B 5/10* (2006.01)
*B65B 7/28* (2006.01)
*B65B 57/10* (2006.01)

(52) U.S. Cl.
CPC ............. *G01N 27/72* (2013.01); *B65B 3/003* (2013.01); *B65B 5/103* (2013.01); *B65B 7/28* (2013.01); *B65B 57/10* (2013.01)

(58) Field of Classification Search
CPC ........ G01N 27/72; B65B 3/003; B65B 5/103; B65B 7/28; B65B 57/10
USPC .......................................................... 324/239
See application file for complete search history.

(56) References Cited

U.S. PATENT DOCUMENTS

| | | | |
|---|---|---|---|
| 7,050,938 B1 * | 5/2006 | Prater | G06Q 10/087 702/182 |
| 7,343,943 B2 | 3/2008 | Khan et al. | |
| 9,409,711 B1 * | 8/2016 | Hanssen | B65G 37/00 |
| 2014/0290180 A1 * | 10/2014 | Olbrich | B65B 61/025 53/411 |

(Continued)

FOREIGN PATENT DOCUMENTS

| | | |
|---|---|---|
| JP | 391502 B2 | 3/2003 |
| JP | 2008213893 A | 9/2008 |

OTHER PUBLICATIONS

Translation of JP2008213893 (Year: 2008).*
International Search Report dated Oct. 29, 2021.

*Primary Examiner* — Christopher P McAndrew
(74) *Attorney, Agent, or Firm* — Dickinson Wright PLLC (57) ABSTRACT

A testing apparatus has at least one sensor for detecting foreign bodies in a container to be tested. The at least one sensor and/or at least one carrier element receiving the container are movable between a first arrangement and a second arrangement. In the first arrangement, the at least one sensor is arranged at a distance in the movement direction from the container. In the second arrangement, the at least one sensor encloses the container at least partially.

13 Claims, 4 Drawing Sheets

(56) References Cited

U.S. PATENT DOCUMENTS

| | | |
|---|---|---|
| 2015/0234075 A1 | 8/2015 | Moore et al. |
| 2015/0353214 A1* | 12/2015 | Gerstner ................ B65D 75/54 53/131.5 |
| 2016/0251101 A1* | 9/2016 | Kong ..................... B65B 57/10 53/445 |
| 2016/0291098 A1 | 10/2016 | Ellison et al. |
| 2019/0009940 A1* | 1/2019 | Scarabelli ............ B65B 51/306 |
| 2019/0168903 A1* | 6/2019 | Green ................... B65B 61/025 |
| 2020/0219112 A1* | 7/2020 | Nakayama ............ B65G 61/00 |
| 2020/0226537 A1* | 7/2020 | Tsugawa .................. B65B 5/08 |

\* cited by examiner

TESTING APPARATUS AND METHOD FOR TESTING CONTAINERS

RELATED APPLICATIONS

The present disclosure is a § 371 of international PCT Application No. PCT/EP2022/060879, filed Apr. 25, 2022, which claims priority to European Application 21171017.3, filed on Apr. 28, 2021, the entire contents of each of which are incorporated herein by reference in their entirety.

FIELD

The present disclosure relates to a testing apparatus, to a packaging machine comprising such a testing apparatus and to a method for testing containers for ingestible products, in particular medical or pharmaceutical products or foodstuffs or food supplements, for foreign bodies, in particular for metallic foreign bodies.

BACKGROUND

Packaging machines for filling bottles and containers similar to bottles, which are generally referred to herein as containers, with ingestible products, for example medical or pharmaceutical products or foodstuffs or food supplements, and for closing the filled containers, are also referred to as bottle lines. Besides a filling unit for filling the containers and a closing unit for closing the filled containers, such a bottle line may furthermore comprise feed units for desiccants and/or cotton wad. Bottle lines operated in a continuous or clocked manner are known, in which the containers correspondingly pass through the bottle line in a continuous or clocked manner.

In the packaging machine, there is a risk that foreign bodies, for example metallic foreign bodies, may enter the containers before they are closed. Containers which contain such foreign bodies must be reliably identified and must not be distributed.

US 2015/0234075 A1 and US 2016/0291098 A1 A1 disclose, for example, metal detectors which are configured in the shape of a tunnel and which have a passage through which a conveyor belt for conveying products to be tested is guided.

We have found that such metal detectors are often unsuitable for use in bottle lines operating in a clocked manner, for example when the containers are not conveyed on a conveyor belt, and may be very expensive, which contributes to high costs of the overall bottle line. If the caps or lids of the containers furthermore contain (metallic) seals, the use of X-ray equipment for testing the container contents for metallic foreign bodies may be necessary, which is likewise very cost-intensive.

SUMMARY

It is an object of the present disclosure to provide a testing apparatus, a packaging machine and a method, which allow simple and economical testing of the container contents for foreign bodies, in particular metallic foreign bodies, in packaging machines operating in a clocked manner.

According to an aspect of the present disclosure, a testing apparatus for a packaging machine for packaging ingestible products, in particular medical or pharmaceutical products or foodstuffs or food supplements, in containers comprises a conveyor device, which is configured to convey a plurality of containers in a clocked manner in a conveying plane in a conveying direction through the testing apparatus, and at least one sensor, which is arranged in a testing region of the testing apparatus and which is configured to detect foreign bodies, in particular metallic foreign bodies, in a container to be tested among the plurality of containers. The at least one sensor and/or at least one carrier element of the testing apparatus, by which the container to be tested is received in the testing region, is configured to be movable such that a relative movement between the at least one sensor and the container to be tested can be generated in a movement direction between a first arrangement and a second arrangement, the movement direction being orientated perpendicularly to the conveying plane. In the first arrangement, the sensor is arranged at a distance in the movement direction from the container to be tested and, in the second arrangement, encloses the container to be tested at least partially.

A testing apparatus is provided in this way, by means of which containers conveyed in a clocked manner in a packaging machine, for example in a bottle line, can easily be checked for foreign bodies and above all metallic foreign bodies.

That a relative movement can be generated between the at least one sensor and the container to be tested in the movement direction is achieved in that either only the at least one sensor is movable and the at least one carrier element with the container to be tested is arranged stationary in the testing region, or the at least one sensor is arranged stationary and only the at least one carrier element with the container to be tested is movable, or both the at least one sensor and the at least one carrier element with the container to be tested are movable. In order to allow a simple and economical structure, preferably only the at least one carrier element is configured to be movable.

Preferably, each container to be tested among the plurality of containers is already filled with ingestible products in the testing region. In particular, each container is filled with a plurality of ingestible products, which preferably comprises between 10 and 200, more preferably between 10 and 150, even more preferably between 10 and 120 products. Optionally, each container to be tested may furthermore already be closed. It is thus possible to prevent foreign bodies from entering the containers after testing of the plurality of containers by the testing apparatus.

In general, the ingestible products are preferably medical products, pharmaceutical products, foodstuffs or food supplements.

Preferably, the ingestible products are solids, for example tablets, pills or capsules. The ingestible products are preferably provided in loose form, or bulk material. This applies both to medical or pharmaceutical products, such as medicines, and to foodstuffs and food supplements. The foodstuffs may for example be chewing gums, pastilles, drops or the like. The food supplements are for example minerals, vitamins, fatty acids or the like in the form of powder, tablets or capsules.

The containers of the plurality of containers are configured to receive the ingestible products in loose form. In other words, the containers are configured to receive ingestible products which are unpackaged, individually handelable or in the form of bulk material, respectively.

The ingestible products may, however, also be liquid products. The containers of the plurality of containers are then configured to directly receive the liquid products, that is to say to be filled with the liquid products.

Consequently, the packaging machine is configured to package corresponding ingestible products into the containers, in particular to fill the containers directly with the ingestible products and to close the containers.

The at least one sensor may be an inductive sensor for detecting metallic foreign bodies and may, for example, be configured as a ring sensor. Such sensors are economical. This has a correspondingly positive effect on the costs of the testing apparatus and of the packaging machine, respectively. Furthermore, these sensors can be integrated easily into the testing apparatus and the packaging machine, respectively, and have a sufficiently high sensitivity and resolution to reliably detect even small metallic foreign bodies.

Preferably, the at least one sensor is configured to detect metallic foreign bodies having a size of between 0.5 and 25 mm, more preferably between 1.0 and 2.0 mm. The size may in this case correspond to a diameter of substantially spherical foreign bodies or an edge length of substantially cuboid foreign bodies.

Particularly preferably, the at least one sensor is configured to detect foreign bodies which are formed from one of the following materials or a combination thereof: iron, stainless steel, aluminum, brass, nonferrous metals.

Preferably, the sensitivity or responsivity of the at least one sensor is adjustable. In this way, the sensitivity of the at least one sensor may be adapted as a function of the products. In particular, the sensitivity of the at least one sensor may be adjustable as a function of a properties of the products, such as a moisture content or metal content. It is thus possible to prevent containers without foreign bodies from being incorrectly identified as erroneous and rejected because of the properties of the products.

In one embodiment, the at least one sensor comprises a first potentiometer and a second potentiometer. The first potentiometer is configured to detect foreign bodies, in particular metallic foreign bodies, in the container to be tested. The second potentiometer is configured to identify the actual potential and transmit it to a control device of the testing apparatus and the packaging machine, respectively.

A further advantage of the at least one sensor is that only a small metal-free region, which should have no metallic objects in order to avoid interference with the at least one sensor, is required around the at least one sensor. Preferably, the metal-free region is defined by a first distance from the at least one sensor parallel to the conveying plane and a second distance from the at least one sensor perpendicular to the conveying plane. The first distance is preferably between 0 mm and 100 mm, more preferably between 0 mm and 75 mm and even more preferably between 0 mm and 50 mm. The second distance is preferably between 0 mm and 200 mm, more preferably between 0 mm and 150 mm and even more preferably between 0 mm and 110 mm. The specified limits of these ranges are also included separately by this disclosure as extreme values of the first and second distances. Likewise, all intermediate values of these specified ranges, particularly in whole millimetres, are intended to be included by content of this disclosure.

The conveyor device is orientated parallel to the conveying plane. Independently thereof and independently of one another, the conveyor device and the conveying plane preferably each extend substantially horizontally. The movement direction is then aligned substantially vertically.

The conveying plane may be defined by a face on which the plurality of containers is conveyed in the conveying direction. For example, the face is a surface of a conveyor table or of a conveyor belt. The conveyor device may, for example, move the plurality of containers on the conveyor table through the testing apparatus.

In order to allow a design of the testing apparatus which is as simple as possible, the relative movement between the at least one sensor and the at least one carrier element and the container to be tested, respectively, between the first arrangement and the second arrangement is directed exclusively in the movement direction. The relative movement between the first and second arrangements is not directed in a direction which differs from the movement direction. In particular, no relative movement between the at least one sensor and the at least one carrier element and the container to be tested, respectively, takes place in the conveying direction between the first arrangement and the second arrangement.

The containers of the plurality of containers are containers which can be closed by means of a lid, which are known for receiving ingestible products of the type described herein. Each container has a bottom, a circumferential wall and a neck. The neck forms an opening of the container, through which the container can be filled with the products and the products can be removed from the container. The lid is preferably pressed or screwed onto the container, in the latter case the neck having a screw thread which engages with a screw thread of the lid. The lid may however have any desired force-fit or form-fit connection to the container, in particular to the neck of the latter. The plurality of containers may be formed from plastic or glass.

In all embodiments described herein, the containers of the plurality of containers are preferably configured as bottles. All features described herein for the containers also apply to bottles. The term "bottle" may therefore readily be used synonymously with the term "container" for this preferred embodiment. Containers which are similar to bottles, such as ampules, carpules or vials are also intended to be included herein by the generic term bottle. This likewise applies for closable (plastic) containers or bottles such as are known, for example, from the field of foodstuffs and food supplements.

Each container of the plurality of containers is preferably configured rotationally symmetrically about a centerline. The centerline is preferably arranged perpendicularly to the conveying plane and parallel to the movement direction, at least in the testing region. The container to be tested may stand with its bottom on the carrier element in the testing region.

Preferably, the containers of the plurality of containers may each have a diameter which is between 20 mm and 1000 mm, more preferably between 25 mm and 77 mm.

A height of the containers of the plurality of containers is preferably between 40 mm and 200 mm.

In a preferred embodiment, the at least one sensor is formed in an annular shape, for example as an (inductive) ring sensor or ring detector, as already described. The at least one annular sensor has an opening, into which the container to be tested can be introduced and which preferably forms a passage. An inner circumference of the at least one sensor corresponds to an inner circumference of the opening and may be adapted to the shape of the container to be tested. Preferably, the inner circumference of the at least one sensor, the inner circumference of the opening and the container to be tested are configured substantially cylindrically. The at least one annular sensor then has the shape of an annulus. Other geometries are, however, also possible.

An inner diameter of the at least one annular sensor corresponds to the diameter of the opening and is greater than the diameter of the plurality of containers. Preferably, the inner diameter of the at least one sensor and the diameter of the opening, respectively, is between 20 mm and 100 mm.

In the case of a passage, a height of the at least one sensor corresponds substantially to a depth of the opening in the axial direction of the opening. The height of the at least one sensor, or the depth of the opening, may be less than the height of the plurality of containers. The at least one sensor then detects a foreign body during the relative movement between the at least one sensor and the container to be tested.

Particularly reliable identification of foreign bodies may be achieved if, in the second arrangement, the at least one sensor fully encloses the container to be tested in the circumferential direction of the container to be tested. Preferably, one sensor in each case encloses precisely one container. This is possible in a particularly simple way with the annular sensor already described, although it may also be implemented with other sensors.

It is furthermore preferred for the testing apparatus to comprise an actuator, which is configured to generate the relative movement between the at least one sensor and the at least one carrier element. Particularly preferably, the actuator is connected to the at least one carrier element and is configured to move the at least one carrier element parallel to the movement direction. The actuator may be an electrical, electromagnetic, hydraulic, pneumatic or mechanical actuator.

In one embodiment, the at least one carrier element may have a gripper which is configured to hold the container to be tested and move it relative to the at least one sensor. The gripper may hold the container to be tested from above, from below or from the side on the circumferential wall. Alternatively, the gripper may hold the container to be tested from above or from the side on the neck or on the lid, in case the latter has already been applied.

In a particularly preferred embodiment, a container to be tested is respectively arranged in the testing region on a carrier element. The at least one carrier element is then configured to support the container to be tested from below in the testing region and to be movable in the movement direction. The at least one carrier element may in this case be configured and mounted particularly simply. The at least one sensor is then preferably arranged stationary in order to allow a simple and economical structure of the testing apparatus. The at least one sensor may, however, also be movable.

Preferably, a contact face of the at least one carrier element, on which the container to be tested is arranged, lies within the conveying plane in the first arrangement and does not lie in the conveying plane in the second arrangement. The container may, for example, stand with its bottom on the contact face. In this way, the container to be tested may be placed as simply as possible on the carrier element by means of the conveyor device, in order to be then fed to the sensor by means of the carrier element. The contact face is preferably arranged parallel to the conveying plane, in particular both in the first and in the second arrangement, and preferably in all positions between the first and the second arrangement.

The at least one carrier element may comprise a suction device for retaining the container on the contact face. For this purpose, the contact face may have at least one opening which is in fluid connection with a vacuum source.

For example, the conveyor table has an opening in which the at least one carrier element is arranged in the first arrangement. An inner circumferential shape of the opening then corresponds to an outer circumference of the at least one carrier element. The container can thus easily be arranged on the at least one carrier element and moved from the first arrangement into the second arrangement.

If the at least one carrier element is configured to be movable in the movement direction, in a first embodiment the at least one sensor may be arranged below the conveying plane and the at least one carrier element may be lowerable in relation to the conveying plane. In a second embodiment, the at least one sensor is arranged above the conveying plane and the at least one carrier element is raisable in relation to the conveying plane.

In the first embodiment, the at least one carrier element may for example be mounted by means of a pretensioning element, such as a spring, and preferably be pretensioned into a position in which the contact face lies within the conveying plane. The actuator is then preferably arranged and configured in such a way that it acts, for example by means of a plunger, against a pretensioning force of the pretensioning element on the at least one carrier element or on the container to be tested. For this purpose, the pretensioning element may be arranged below the at least one carrier element and connected to the latter, and the actuator with the plunger is arranged above the at least one carrier element and the container to be tested. The actuator can move the container and the at least one carrier element in the movement direction by means of the plunger into the second arrangement, in particular by pressing downwards.

Alternatively, the actuator may be firmly connected to the at least one carrier element such that an actuating movement of the actuator is transmitted directly onto the at least one carrier element. For example, the actuator is arranged below the at least one carrier element and is configured to move the at least one carrier element upwards and downwards parallel to the movement direction. The second embodiment may also be implemented in this way.

In an exemplary embodiment, the at least one carrier element is movably mounted on a linear guide, which extends parallel to the movement direction. The at least one carrier element is then movable along the linear guide by means of the actuator. For example, the actuator is configured as a servomotor and drives, by means of a belt drive, the at least one carrier element, or a connecting element which couples the at least one carrier element to the linear guide. This has the advantage that the acceleration of the carrier element can be adjusted precisely by means of the servomotor so that, for example in the case of containers which are still open, the products are prevented from falling out of the containers. It is, however, also conceivable to move the at least one carrier element by means of a spindle drive, a hydraulic or pneumatic cylinder drive or alternative drives.

Both in the first embodiment and in the second embodiment, the at least one sensor is preferably mounted in a fixed position, for example on a frame or housing of the testing apparatus or of the packaging machine.

Alternatively, the at least one sensor may be movable. In this case, it is preferred for the at least one carrier element to be stationary, so that a simple structure of the testing apparatus is possible. For example, the at least one carrier element is formed by the conveyor table, the surface of which defines the conveying plane. The at least one sensor may be arranged above the conveying plane and lowerable parallel to the movement direction.

In order to increase the efficiency of the testing apparatus, the testing apparatus particularly preferably comprises a plurality of sensors and a plurality of carrier elements. The plurality of sensors comprises the at least one sensor described above. Each sensor of the plurality of sensors may be configured according to the at least one sensor, so that all features described herein in relation to the at least one sensor apply similarly to the plurality of sensors. The plurality of carrier elements comprises the at least one carrier element described above. Each carrier element of the plurality of carrier elements may be configured according to the at least one carrier element, so that all features described herein in relation to the at least one carrier element apply similarly to the plurality of carrier elements.

Preferably, each sensor of the plurality of sensors is configured to detect foreign bodies in precisely one container. Each carrier element of the plurality of carrier elements preferably receives precisely one container of the plurality of containers. Consequently, one carrier element is preferably assigned to each sensor.

For example, the testing apparatus comprises at least one further sensor, which is arranged in a further testing region of the testing apparatus and is configured to detect foreign bodies, in particular metallic foreign bodies, in a further container to be tested among the plurality of containers. The at least one further sensor and/or at least one further carrier element of the testing apparatus, by which the further container to be tested is received in the further testing region, is configured to be movable such that a relative movement between the at least one further sensor and the further container to be tested can be generated in the movement direction between a first arrangement and a second arrangement. In the first arrangement, the at least one further sensor is arranged at a distance in the movement direction from the further container to be tested, and, in the second arrangement, the at least one further sensor at least partially encloses the further container to be tested. Consequently, the testing apparatus comprises the plurality of sensors, which comprises at least the sensor and the at least one further sensor for testing a plurality of containers to be tested, which comprises at least the container to be tested and at least one further container to be tested.

Preferably, the plurality of sensors is arranged successively in the conveying direction. Preferably, the plurality of carrier elements is arranged successively in the conveying direction. One carrier element may thus be assigned to each sensor.

The plurality of containers may be conveyed through the testing apparatus, in particular through the entire packaging machine, in a row, the row being arranged parallel to the conveying direction. It is also conceivable for the plurality of containers to be moved through the testing apparatus and the packaging machine, respectively, in a plurality of parallel rows.

The plurality of sensors may be configured to test the plurality of containers to be tested among the plurality of containers simultaneously. For this purpose, the plurality of sensors and/or the plurality of carrier elements may be configured to be movable such that the relative movement between the plurality of sensors and the containers to be tested takes place synchronously.

In a particularly preferred embodiment, the carrier elements of the plurality of carrier elements are lowerable in relation to the conveying plane. The carrier elements of the plurality of carrier elements may be connected to one another such that they are movable synchronously. The plurality of sensors is in this case arranged below the conveying plane, preferably stationary.

Not all the carrier elements of the plurality of carrier elements need to be movable synchronously with one another, or connected to one another. It is also conceivable that a group of carrier elements out of the plurality of carrier elements, which does not comprise all the carrier elements, are respectively movable synchronously and preferably connected to one another.

For example, a group of carrier elements is mounted on a common connecting element. The connecting element may furthermore connect the group of carrier elements to the linear guide, as described above. Similarly, the entire plurality of carrier elements may be mounted on a common connecting element.

In order to prevent the sensors from influencing one another, it is furthermore preferred for at least two sensors of the plurality of sensors to be operable with a different frequency. More precisely, a first sensor of the plurality of sensors is operable with a first frequency and a second sensor of the plurality of sensors is operable with a second frequency, which is different from the first frequency. The frequency of each sensor is preferably predefined, so that it cannot be changed by an operator of the packaging machine. In particular, two sensors of the plurality of sensors, which are arranged next to each other in the conveying direction, may be operable with a different frequency.

All features described in relation to the sensor, the container to be tested and the carrier element apply to the at least one further sensor, the at least one further container to be tested and the at least one further carrier element in an analogue way, and therefore to all sensors, containers to be tested and carrier elements which are described herein. For reasons of simpler reference and clearer description, irrespective of the actual number of sensors, the sensor is also referred to herein as the first sensor, the container to be tested as the first container and the carrier element as the first carrier element. In the case of a plurality of sensors, the further sensor may also be referred to as the second sensor, the further container to be tested as the second container and the further carrier element as the second carrier element. Analogously, the testing apparatus may comprise at least one third sensor, at least one third container to be tested and at least one third carrier element, and so on respectively.

Preferably, the relative movement between the plurality of sensors and the respective container of the plurality of containers to be tested between the respective first arrangement and the respective second arrangement takes place parallel and simultaneously. That is to say, the movement direction of each pair of a sensor of the plurality of sensors and the corresponding container to be tested of the plurality of containers to be tested is aligned parallel to the movement direction of the first sensor and of the first container.

According to another aspect of the present disclosure, a packaging machine for packaging ingestible products, in particular medical or pharmaceutical products or foodstuffs or food supplements, in containers comprises a feed unit, which is configured to feed a plurality of containers into the packaging machine, a filling unit, which is configured to fill the plurality of containers with the ingestible products, a closing unit, which is configured to close the plurality of containers respectively with a lid, and a testing apparatus according to an embodiment of the present disclosure for testing the plurality of containers for foreign bodies, in particular metallic foreign bodies, therein.

In this way, a packaging machine is provided, by means of which containers conveyed in a clocked manner can be simply tested for foreign bodies, and above all for metallic foreign bodies, during the packaging process.

The packaging machine may furthermore comprise a desiccant feeder, which is configured to feed desiccants into the plurality of containers, and independently thereof a cotton wad feeder (also referred to as a cottoner), which is configured to feed cotton wads into the plurality of containers The feed unit is arranged ahead of the filling unit and the closing unit is arranged behind the filling unit. If present, the desiccant feeder is preferably arranged between the feed unit and the filling unit. The cotton wad feeder, if present, is preferably arranged between the filling unit and the closing unit.

A structure of the packaging machine which is as simple and compact as possible is made possible by the plurality of containers being moved in the conveying plane and in the conveying direction in the packaging machine, in particular between the feed unit, the filling unit and the closing unit, and preferably in the entire packaging machine.

The conveyor device of the testing apparatus is preferably configured to convey the plurality of containers in a clocked manner through the filling unit, the closing unit and the testing apparatus, and optionally through the entire packaging machine. The conveyor device may comprise a plurality of conveyor elements, which are preferably movable synchronously with one another.

The packaging machine may be configured as a bottle line in which all the necessary units, feeders and (testing) apparatuses are integrated. The containers of the plurality of containers are then formed by bottles, as already described The conveyor table may extend through the entire packaging machine so that the plurality of containers, or bottles, are conveyed on the conveyor table through at least the units, feeders and (testing) apparatuses described herein, and preferably through all the units, feeders and (testing) apparatuses) of the bottle line.

In principle, the testing apparatus may be integrated into at least one of the feed, filling or closing units or into at least one of the desiccant or cotton wad feeders of the packaging machine. Alternatively, the testing apparatus may be arranged downstream of one of the feed, filling or closing units or the desiccant or cotton wad feeders in the conveying direction. In this case, the testing apparatus forms an independent module of the packaging machine.

It is also conceivable for the packaging machine to comprise a plurality of testing apparatuses, in which case each testing apparatus of the plurality of testing apparatuses may be configured or arranged according to one of the variants described above.

A particularly space-saving structure of the packaging machine is made possible if the testing apparatus is integrated into the filling unit or the closing unit. The testing apparatus may also be integrated into the cotton wad feeder, if present.

A testing apparatus integrated into the closing unit, and likewise a testing apparatus arranged downstream of the closing unit, offer the advantage that the containers are closed immediately after the testing or are already closed during the testing. The risk of contamination of the container contents with foreign bodies after the testing is thereby minimized or eliminated.

Integration of the testing apparatus into the filling unit or the closing unit may for example be implemented as follows.

In a preferred embodiment, the filling unit comprises a plurality of filling devices, each of which is configured to fill a container of the plurality of containers and which are arranged at a distance from one another in the conveying direction. The sensor of the testing apparatus is then arranged between two adjacent filling devices of the plurality of filling devices in the conveying direction. If the testing apparatus comprises a plurality of sensors, each sensor is arranged downstream of a filling device of the plurality of filling devices. Alternatively, the sensor or each sensor of the plurality of sensors may be arranged upstream of a filling device.

In addition or alternatively, the closing unit comprises a plurality of closing devices, which are respectively configured to close a container of the plurality of containers and which are arranged at a distance from one another in the conveying direction. The sensor of the testing apparatus is then arranged between two adjacent closing devices of the plurality of closing devices in the conveying direction. If the testing apparatus comprises a plurality of sensors, each sensor is arranged downstream of a closing device of the plurality of closing devices. Alternatively, the sensor or each sensor of the plurality of sensors may be arranged upstream of a closing device.

In addition or alternatively, the cotton wad feeder comprises a plurality of feed devices, which are respectively configured to feed cotton wads into a container of the plurality of containers and which are arranged at a distance from one another in the conveying direction. The sensor of the testing apparatus is then arranged between two adjacent feed devices of the plurality of feed devices in the conveying direction. If the testing apparatus comprises a plurality of sensors, each sensor is arranged downstream of a feed device of the plurality of feed devices. Alternatively, the sensor or each sensor of the plurality of sensors may be arranged upstream of a feed device. This may also apply similarly for the desiccant feeder.

As already mentioned, the testing apparatus may alternatively be configured substantially independently of the further units or feeders of the packaging machine and, for example, form an independent module of the packaging machine. In this way, the flexibility of the arrangement of the testing apparatus inside the packaging machine is increased and a smaller number of variants of the units or feeders may be achieved, which in turn allows a cost reduction.

The testing apparatus may for example be arranged between the filling unit and the closing unit or, if present, between the cotton wad feeder and the closing unit. Particularly preferably, the testing apparatus is arranged ahead of the closing unit, in particular between the filling unit and the closing unit.

In one embodiment, the testing apparatus may be arranged behind the closing unit in the conveying direction, that is to say downstream of the closing unit. This ensures that already filled containers can no longer receive foreign bodies since they are already closed at the time of the testing.

According to another aspect of the present disclosure, a method for testing containers for ingestible products, in particular for medical or pharmaceutical products or foodstuffs or food supplements, comprises the following steps:
a) feeding a plurality of containers in a clocked manner within a conveying plane in a conveying direction;
b) arranging a container to be tested of the plurality of containers in a testing region in a first arrangement relative to at least one sensor for detecting foreign bodies, in particular metallic foreign bodies, the at least one sensor being arranged at a distance in a movement direction from the container to be tested in the first arrangement, the movement direction being orientated perpendicularly to the conveying plane;
c) generating a first relative movement between the container to be tested and the at least one sensor in the movement direction from the first arrangement into a second arrangement, in which the at least one sensor at least partially encloses the container to be tested;

d) detecting by means of the at least one sensor whether a foreign body is contained in the container to be tested, and thereby testing the container;

e) generating a second relative movement between the tested container and the at least one sensor parallel to the movement direction back into the first arrangement; and f) feeding the tested container from the testing region, preferably within the conveying plane in the conveying direction.

In this way a method is provided by means of which containers which are conveyed in a clocked manner in a packaging machine, for example a bottle line, can easily be tested for foreign bodies and above all metallic foreign bodies.

Unless otherwise described, all the steps of the method which are indicated herein are preferably carried out in the order specified.

The method is preferably carried out by means of the testing apparatus or the packaging machine. All features described in relation to the testing apparatus and the packaging machine are therefore applicable to the method in an analogous manner, and vice versa.

Steps b) to f) are respectively carried out for one container, for example for the first container. By testing the container to be tested according to step d), the container to be tested becomes the tested container but is still the same container, for example the first container.

Preferably, the method comprises repetition of steps b) to f) for further containers to be tested of the plurality of containers.

If a plurality of sensors is provided, the method may comprise carrying out steps b) to f) simultaneously for a plurality of containers to be tested of the plurality of containers. For example, steps b) to f) may be carried out simultaneously for the first, the second and the third container.

Step d) may be carried out when the at least one sensor and the container to be tested are arranged in the second arrangement and/or during the first relative movement of step c) and/or during the second relative movement of step e).

The generation of the first relative movement according to step c) preferably comprises lowering the container to be tested in relation to the conveying plane, wherein the at least one sensor is arranged below the conveying plane. Alternatively, the generation of the first relative movement according to step c) comprises raising the container to be tested in relation to the conveying plane, wherein the at least one sensor is arranged above the conveying plane. In both cases, the at least one sensor may be arranged stationary in order to allow a simple structure of the testing apparatus. The lowering or raising of the container to be tested, for example by means of the at least one carrier element of the testing apparatus, may be carried out particularly simply.

In addition or alternatively, the generation of the first relative movement according to step c) may comprise raising or lowering the at least one sensor in relation to the conveying plane, wherein lowering the at least one sensor is preferred because of the simpler implementation. The at least one sensor is then arranged above the conveying plane. The container to be tested is preferably arranged stationary.

The second relative movement always opposite to the first relative movement.

Steps a), b) and f) are preferably carried out by means of the conveyor device of the testing apparatus. Steps c) and e) are preferably carried out by the at least one sensor and/or the at least one carrier element of the testing apparatus.

The method may furthermore comprise filling the plurality of containers, which is preferably carried out by the filling unit of the packaging machine. The method may furthermore comprise closing the plurality of containers, which is preferably carried out by the closing unit of the packaging machine. Optionally, the method may comprise feeding a desiccant into each container of the plurality of containers, preferably by means of the desiccant feeder, and/or feeding cotton wads into each container of the plurality of containers, preferably by means of the cotton wad feeder.

Steps b) to f) are preferably carried out after filling or after closing the container to be tested.

If the sensitivity of the at least one sensor is adjustable, the method preferably furthermore comprises the step of:

adjusting the sensitivity of the at least one sensor as a function of the ingestible products, in particular as a function of the properties of the ingestible products.

This prevents containers without foreign bodies from being incorrectly identified as erroneous and from being rejected, as already described.

DETAILED DESCRIPTION

Figure 1:
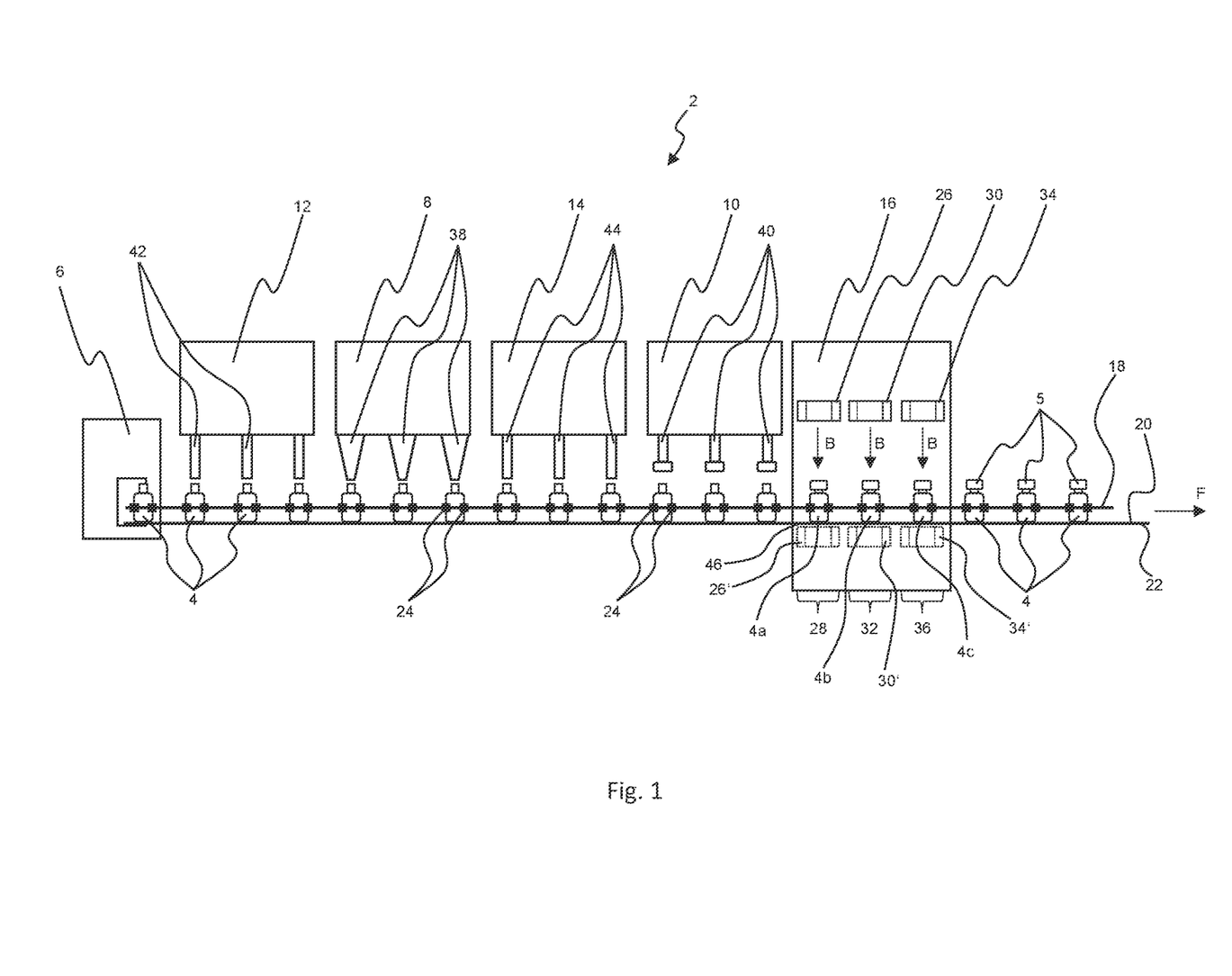
FIG. 1 schematically shows a packaging machine comprising a testing apparatus according to a first embodiment.

FIG. 1 schematically represents a side view of a packaging machine 2 according to an embodiment the disclosure for packaging ingestible products (not shown) in containers 4. In particular, the packaging machine 2 is configured as a bottle line which comprises all the essential units, feeders and apparatuses for packaging the ingestible products into the containers 4, which are configured as bottles. It is to be understood, however, that this disclosure is not limited to a bottle line and to containers 4 configured as bottles, but generally applies to packaging machines 2 for corresponding containers 4.

The packaging machine 2 comprises a feed unit 6 which is configured to feed a plurality of containers 4 into the packaging machine 2, a filling unit 8 which is configured to fill the plurality of containers 4 with the ingestible products, and a closing unit 10 which is configured to close the plurality of containers 4 respectively with a lid 5. Optionally, the packaging machine 2 furthermore comprises a desiccant feeder 12 which is configured to feed desiccants into the plurality of containers 4, and a cotton wad feeder 14 which is configured to feed cotton wads into the plurality of containers 4. Finally, the packaging machine 2 also comprises a testing apparatus 16 which is configured to test the plurality of containers 4 for foreign bodies, in particular metallic foreign bodies.

The testing apparatus 16 comprises a conveyor device 18, which is configured to move the plurality of containers 4 in a clocked manner within a conveying plane 20 and in a conveying direction F through the testing apparatus 16. The conveying direction F extends parallel to the conveying plane 20. Preferably, the conveying direction F and the conveying plane 20 are orientated horizontally. The conveying plane 20 may for example be defined by a surface of a conveyor table 22, on which the plurality of containers 4 are conveyed through the testing apparatus 16.

The conveyor device 18 engages each of the plurality of containers 4, preferably by a form-fit, as indicated by the retaining elements 24 in FIG. 1. For example, the conveyor device 18 is a rail which extends substantially parallel to the conveying direction F and on which projections are applied or formed as retaining elements 24. Such a conveyor device 18 is also referred to as a "rake". Alternative suitable conveyor devices are known to a person skilled in the art.

The feed unit 6, the filling unit 8 and the closing unit 10 are arranged in this order behind each other in the conveying direction F in order to initially fill and then close containers 4 which are being fed. The desiccant feeder 12 is preferably arranged between the feed unit 6 and the filling unit 8 in the conveying direction F, and the cotton wad feeder 14 is preferably arranged between the filling unit 8 and the closing unit 10 in the conveying direction F, although they may also be arranged at other positions in order to adapt to the existing requirements. It is likewise conceivable for the packaging machine 2 to comprise further units, or processing stations.

It is particularly advantageous for the conveyor device 18 to be configured to convey the plurality of containers 4 not only through the testing apparatus 16 but through the packaging machine 2, preferably through the entire packaging machine 2. In the embodiment shown, the plurality of containers 4 is conveyed in the conveying direction F by means of the conveyor device 18 from the feed unit 16 through the desiccant feeder 12, the filling unit 8, the cotton wad feeder 14, the closing unit 10 and the testing apparatus 16 within the conveying plane 20. Correspondingly, the conveyor table 22 may extend through the entire packaging machine 2, that is to say from the feed unit 6 to the closing unit 10 and the testing apparatus 16, and optionally beyond the latter.

A particularly space-saving structure of the packaging machine 2 is obtained when, in the entire packaging machine 2, the plurality of containers 4 are moved within the conveying plane 20 and in the conveying direction F through the units and apparatuses of the packaging machine 2.

In the embodiment shown, the testing apparatus 16 is arranged behind the closing unit 10 in the conveying direction F, that is to say downstream of the closing unit 10. This has the advantage that already closed containers 4 are tested by means of the testing apparatus 16. Contamination of the container contents of the containers 4 by foreign bodies is consequently no longer possible after the testing. The testing apparatus 16 may in this case be configured as an independent module of the packaging machine 2.

The testing apparatus 16 may also be arranged at another position in the packaging machine 2, for example behind the filling unit 8 or the cotton wad feeder 14 in the conveying direction F, and therefore, in the conveying direction F, between the respective unit and the subsequent unit. Likewise, the packaging machine 2 may have a plurality of testing apparatuses 16 at different positions. FIGS. 2*a-b* and 3*a-c* furthermore show embodiments in which the testing apparatus 16 is integrated into a unit of the packaging machine 2, particularly into the filling unit 8, the cotton wad feeder 14 or the closing unit 10, as described below with reference to these figures.

As may be seen in FIG. 1, the testing apparatus 16 comprises at least one sensor 26, which is arranged in a testing region 28 of the testing apparatus 16 and is configured to detect foreign bodies, in particular metallic foreign bodies, in a container 4*a* to be tested among the plurality of containers 4.

The testing apparatus 16 may also comprise a plurality of sensors. The sensor 26 is therefore also referred to as a first sensor 26, the testing region 28 as a first testing region 28 and the container 4*a* to be tested as a first container 4*a*. Furthermore, besides the first sensor, the plurality of sensors here comprises at least one further sensor, for example the second sensor 30, which is arranged in a second testing region 32 and is configured to detect foreign bodies in a second container 4*b* to be tested, as well as a third sensor 34, which is arranged in a third testing region 36 and is configured to detect foreign bodies in a third container 4*c* to be tested. The plurality of sensors therefore comprises the first, the second and the third sensors 26, 30, 34. The plurality of sensors 26, 30, 34 is preferably arranged successively in the conveying direction F. The plurality of sensors 26, 30, 34 may be configured to simultaneously test the containers 4*a*, 4*b*, 4*c* to be tested, here the first, the second and the third containers 4*a*, 4*b*, 4*c*.

The first sensor 26 or, if present, the plurality of sensors 26, 30, 34 may be arranged above the conveying plane 20. Preferably, the plurality of sensors 26, 30, 34 is arranged below the conveying plane 20, as represented by dashes in FIG. 1 for the first, the second and the third sensors 26', 30', 34' and shown in more detail in FIG. 4.

It may furthermore be seen in FIG. 1 that the units 8, 10 and feeders 12, 14 as well as the testing apparatus 16 of the packaging machine 2 are preferably configured respectively to fill, close and test multiple containers 4 of the plurality of containers 4, in order to increase the efficiency of the packaging machine 2.

For example, the filling unit 8 comprises a plurality of filling devices 38, each of which is configured to fill one container 4 of the plurality of containers and which are arranged at a distance from one another in the conveying direction F. The closing unit 10 may comprise a plurality of closing devices 10, each of which is configured to close a container 4 of the plurality of containers 4 and which are arranged at a distance from one another in the conveying direction F. If present, the desiccant feeder 12 may comprise a plurality of first feed devices 42 and the cotton wad feeder 14 may comprise a plurality of second feed devices 44, the plurality of first feed devices 42 and the plurality of second feed devices 44 respectively being configured to feed a desiccant or cotton wad into a container 4 of the plurality of containers 4 and being arranged at a distance from one another in the conveying direction F.

For cyclic operation of the packaging machine 2, it is advantageous for the number of filling devices 38, closing devices 40, first feed devices 42, second feed devices 44 and sensors 26, 30, 34 to correspond to the same predetermined number. In the example shown, the predetermined number is three, so that three devices 38, 40, 42, 44 and three sensors 26, 30, 34 are respectively provided. In each cycle of the packaging machine 2, three containers 4 of the plurality of containers 4 are therefore processed at each unit 8, 10, feeder 12, 14, or at the testing apparatus 16 of the packaging machine 2.

Figure 2A:
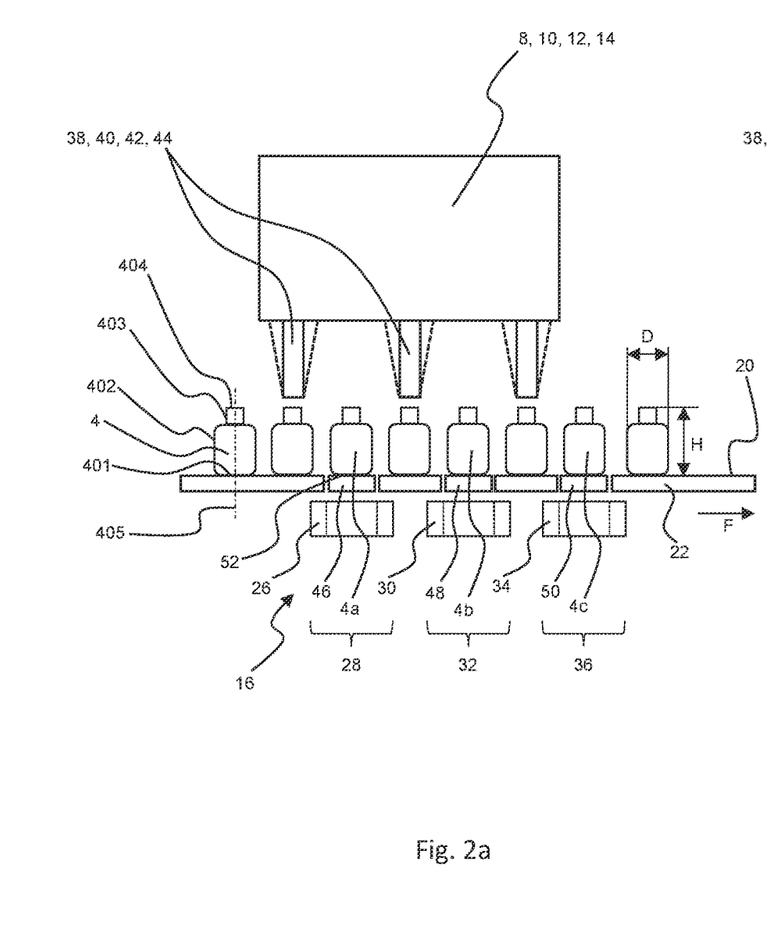
FIG. 2a, b schematically show a testing apparatus according to a second embodiment in a first arrangement and in a second arrangement.
Figure 2B:
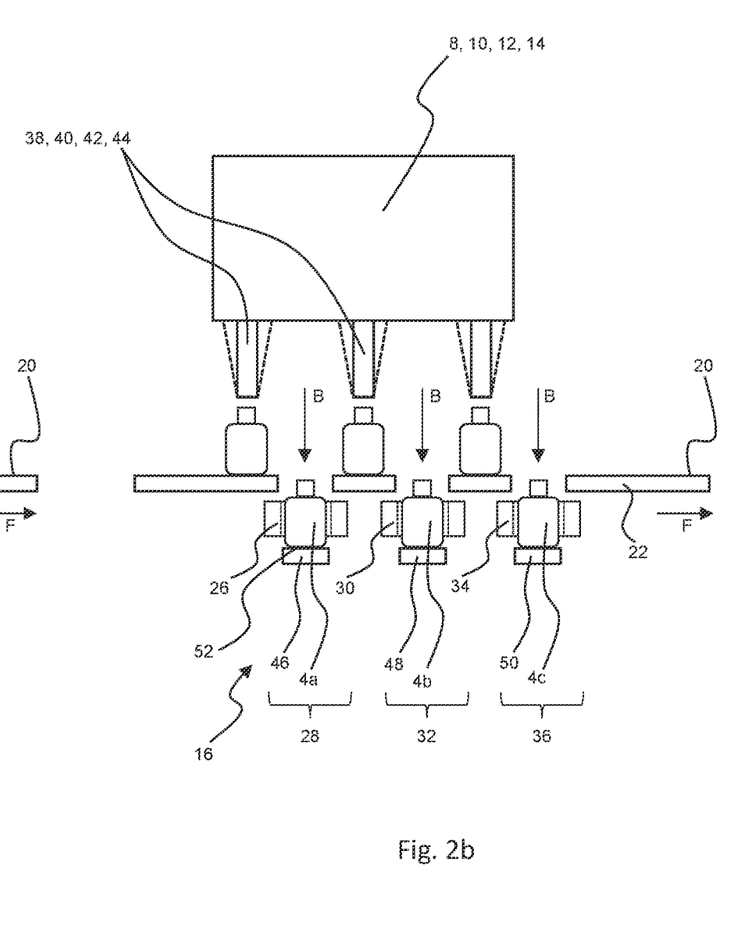

FIG. 2 shows an exemplary embodiment in which the testing apparatus 16 is integrated into the filling unit 8, the closing unit 10, the desiccant feeder 12 or the cotton wad feeder 14. For illustration, FIGS. 2*a* and 2*b* represent all positions occupied with containers 4. It is to be understood that in particular the number, the spacing and the cycling of the containers 4 may be adapted in any desired way to the respectively existing requirements.

If the testing apparatus 16, and therefore the first sensor 26 or the plurality of sensors 26, 30, 34, is integrated into one of the units 8, 10 or feeders 12, 14, the first sensor 26 is preferably arranged between two neighbouring devices 38, 40, 42, 44 of the respective unit 8, 10 or feeder 12, 14 in the conveying direction F. In the case of a plurality of sensors 26, 30, 34, each sensor 26, 30, 34 is preferably arranged upstream or downstream of one of these devices 38, 40, 42, 44. The spacing of the devices 38, 40, 42, 44 of the respective unit 8, 10 or feeder 12, 14 in the conveying direction is also to be adapted to the respectively existing requirements. Thus, for example, one container or a plurality of containers may be arranged between neighbouring devices.

In all embodiments described herein, the first sensor 26 and/or a carrier element 46 of the testing apparatus 16, by which the first container 4a to be tested is received in the testing region 28 and which is therefore also referred to as the first carrier element 16, is configured to be movable such that a relative movement between the first sensor 26 and the first container 4a to be tested can be generated in a movement direction B between a first arrangement and a second arrangement. The movement direction B is orientated perpendicularly to the conveying plane 20. In the first arrangement, the first sensor 26 is arranged at a distance in the movement direction B from the first container 4a to be tested and, in the second arrangement, at least partially encloses the first container 4a to be tested. If a plurality of sensors 26, 30, 34 is provided, the described relationship applies to each sensor of the plurality of sensors 26, 30, 34 and the respective container 4a, 4b, 4c to be tested accordingly.

Figure 3A:
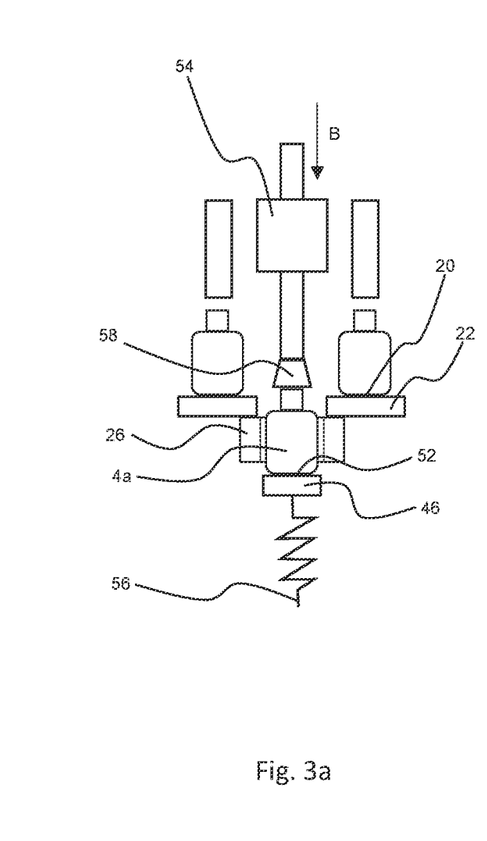
FIG. 3a-c schematically show various embodiments of a carrier element of a testing apparatus.
Figure 3B:
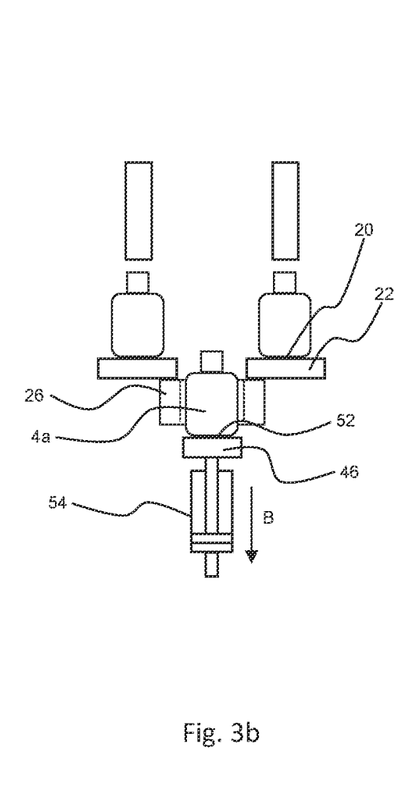
Figure 3C:
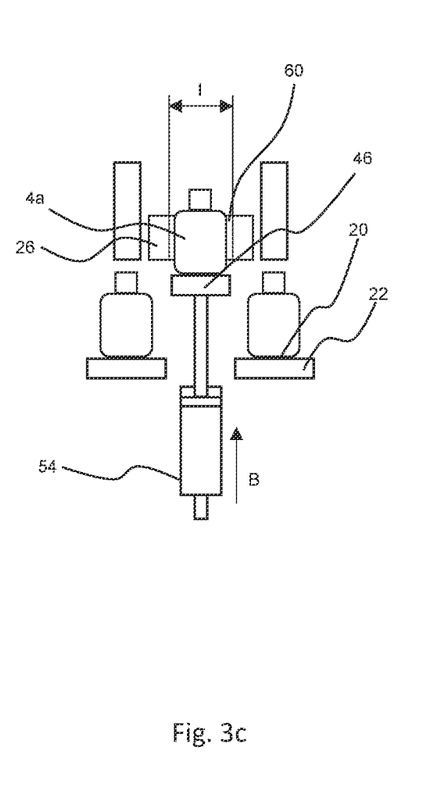

The relative movement between the first sensor 26 and the first container 4a to be tested may be generated in various ways. Optionally, only the first sensor 26 may be movable in order to generate the relative movement between the first arrangement and the second arrangement, whereas the first carrier element 46 with the first container 4a to be tested is arranged stationary in the first testing region 28. This is possible for example in the embodiment of FIG. 1, in which case the first sensor 26 or the plurality of sensors 26, 30, 34 may be mounted in the testing apparatus 16 so as to be movable in the movement direction B. The plurality of sensors 26, 30, 34 may be arranged above the containers 4a, 4b, 4c to be tested in the first arrangement and moved downwards in movement direction B into the second arrangement until the sensors 26, 30, 34 enclose the containers 4a, 4b, 4c. The first carrier element 46 and a second carrier element 48, by which the second container 4b is received, and a third carrier element 50, by which the third container 4c is received, may in this case respectively form a portion of the conveyor table 22, in particular may also be formed integrally with the conveyor table 22. In embodiments in which the testing apparatus 16 is integrated into one of the units 8, 10 or feeders 12, 14 of the packaging machine 2, as shown in FIGS. 2 and 3, the first sensor 26 or the plurality of sensors 26, 30, 34 may also be movable and the container 4a, 4b, 4c to be tested respectively may be arranged stationary.

Alternatively, the relative movement may be generated by the first sensor 26 or the plurality of sensors 26, 30, 34 being arranged stationary and only the respective carrier element 46, 48, 50 and therefore the respective container 4a, 4b, 4c to be tested being movable. Exemplary embodiments thereof are described below with reference to FIG. 2, FIG. 3 and FIG. 4, and may be applied similarly to the testing apparatus 16 of FIG. 1, which is configured independently of the other elements 8, 10 and feeders 12, 14 of the packaging machine 2. The conveyor device 18 is not represented in FIGS. 2, 3 and 4 for reasons of clarity.

In a further alternative, both the first sensor 26 and the first carrier element 46 with the first container 4a to be tested are configured to be movable. This also applies for the plurality of sensors 26, 30, 34 and the plurality of carrier elements 46, 48, 50. Since this alternative is a combination of the other two possibilities for generating the relative movement between the first sensor 26 and the first container 4a to be tested, it is not described separately in detail.

FIG. 2a shows the plurality of containers 4a, 4b, 4c to be tested and the plurality of sensors 26, 30, 34 in the respective first arrangement, and FIG. 2b shows the plurality of containers 4a, 4b, 4c to be tested and the plurality of sensors 26, 30, 34 in the respective second arrangement. The features described below by way of example under reference to the first sensor 26, the first container 4a and the first carrier element 46 apply in an analogous way to the second sensor 30, the second container 4b and the second carrier element 48 as well as to the third sensor 34, the third container 4c and the third carrier element 50.

The first carrier element 46 is movably mounted in the movement direction B and the first sensor 26 may in principle be arranged above or below the conveying plane 20. Various examples of such mounting are described with reference to FIG. 3a-3c. The first carrier element 46 may be lowerable in relation to the conveying plane 20 when the first sensor 26, in a first embodiment, is arranged below the conveying plane 20, as represented in FIGS. 2, 3a, 3b and 4. The first carrier element 46 may however also be raisable in relation to the conveying plane 20 when the first sensor 26, in a second embodiment, is arranged above the conveying plane 20, as represented in FIGS. 1 and 3c.

In the first testing region 28, the first container 4a is arranged on the first carrier element 46, which in the first arrangement preferably forms a plane with the conveyor table 22. Preferably, the first carrier element 46 has a contact face 52 on which the first container 4a stands. In the first arrangement (FIG. 2a), the contact face 52 lies within the conveying plane 20 and, in the second arrangement (FIG. 2b), does not lie within the conveying plane 20. Preferably, the contact face 52 is always aligned parallel to the conveying plane 20.

If the first container 4a to be tested and the first sensor 26 are arranged relative to one another in the testing region 28 in the first arrangement, the relative movement between the first container 4a and the first sensor 26 can be generated in the movement direction B as represented in FIG. 2b. This relative movement is also referred to as the first relative movement. The first carrier element 46 in this case moves the first container 4a from the first arrangement into the second arrangement, in which the first sensor 26 encloses the first container 4a at least partially. Preferably, the first sensor 26 is configured as a ring sensor and, in the second arrangement, completely encloses the first container 4a in the circumferential direction of the first container 4a.

During the first relative movement from the first arrangement into the second arrangement, and/or in the second arrangement, the first sensor 26 detects whether a foreign body is contained in the first container 4a and therefore tests the container 4a for foreign bodies.

Once the first container 4a has been tested, a relative movement, which is also referred to as the second relative movement, may be generated between the tested first container 4a and the first sensor 26 parallel to the movement direction B back into the first arrangement (FIG. 2a). The first carrier element 46 in this case moves the first container 4a from the second arrangement into the first arrangement, so that the first sensor 26 is again arranged at a distance from the first container 4a. The first container 4a may then be conveyed out of the first testing region 28 in order to allow the testing of a further container 4 of the plurality of containers 4 by means of the first sensor 26 in a next cycle.

As may furthermore be seen in FIG. 2a, each container 4 generally has a bottom 401, a circumferential wall 402 and a neck 403. The neck 403 forms an opening 404 of the container 4, through which the container 4 can be filled with the ingestible products and through which the ingestible products can be removed from the container. A lid 5 (see FIG. 1) is preferably pressed or screwed onto the container 4, in the latter case the neck 403 having a screw thread which engages with a screw thread of the lid 5. Each container 4 of the plurality of containers 4 is preferably configured rotationally symmetrically about a centerline 405. The centerline 405 is preferably orientated perpendicularly to the conveying plane 20 and parallel to the movement direction B, at least in the testing region 28. Furthermore, each container 4 of the plurality of containers 4 has a diameter D, which is preferably to be measured in the region of the circumferential wall 402, particularly in the region of a greatest diameter of the circumferential wall 402. A height H of each container 4 is preferably defined parallel to the centerline 405 of the container 4 from the bottom 401 to an upper edge of the neck 403. Such containers may also be referred to as bottles.

FIGS. 3a to 3c and 4 represent various possibilities of movably mounting at least of the first carrier element 46. FIGS. 3a to 3c respectively represent a detail of the testing apparatus 16 and the packaging machine 2, respectively, with the first sensor 26 and the first container 4a and the first carrier element 46 in the second arrangement. It is to be understood that in each embodiment of FIGS. 3a to 3c, the first sensor 26, the first container 4a and the first carrier element 46 may be arranged in a similar way to the arrangement in FIG. 2a in the first arrangement. Furthermore, the possibilities represented in FIGS. 3a to 3c for movably mounting the first carrier element 46 may be applied in an analogous manner to embodiments in which the testing apparatus 16 is configured independently, as represented for example in FIG. 1.

Furthermore, the possibilities shown apply in an analogous manner to the plurality of sensors 26, 30, 34, the plurality of containers 4a, 4b, 4c to be tested and the plurality of carrier elements 46, 48, 50.

In all embodiments of FIGS. 3a to 3c, the testing apparatus 16 comprises an actuator 54 which is connected to or acts on the first carrier element 46 and is configured to move the first carrier element 46 parallel to the movement direction B.

In the embodiment of FIG. 3a, the first carrier element 46 is pretensioned by means of a pretensioning element 56 into a position in which the first contact face 52 lies within the conveying plane 20. The pretensioning element 56 may be a spring element, for example a compression spring. The actuator 54 may be a hydraulic or pneumatic actuator, for example a hydraulic cylinder or a pneumatic cylinder, or an electrical, electromagnetic or mechanical linear drive. The actuator 54 is arranged and configured in such a way that it acts on the first carrier element 46 by means of a plunger 58 against a pretensioning force of the pretensioning element 56 or, as shown, on the first container 4a. More precisely, the pretensioning element 56 may for this purpose be arranged below and connected to the first carrier element 46, and the actuator 54 with the plunger 58 may be arranged above the first carrier element 46 and the first container 4a to be tested. If the plunger 48 is moved downwards in the movement direction B by means of the actuator 54, the plunger 58 impinges on the first container 4a and presses it, together with the first carrier element 46, downwards from the first arrangement into the second arrangement. During this first relative movement, the first carrier element 46 and the first container 4a are moved at least partially through the first sensor 26. If the testing apparatus 16 is integrated into the closing unit 10 or is arranged after the closing unit 10, the plunger 58 impinges on the lid 5 on the first container 4a. Otherwise, the plunger 28 impinges on the neck 403 of the first container 4a. Here, the first sensor 26 is arranged below the conveying plane 20 and, for example, is mounted stationary on the conveyor table 22.

In the embodiment of FIG. 3b, the actuator 54 is firmly connected to the first carrier element 46 such that an actuating movement of the actuator 54 is transmitted directly onto the first carrier element 46. The actuator 54 is represented here by way of example as a hydraulic or pneumatic cylinder, although it may also be formed by any other desired actuator, as described above. The first sensor 26 is also arranged below the conveying plane 20 in this embodiment and, for example, mounted stationary on the conveyor table 22. The actuator 54 is arranged below the first carrier element 46 and, for example, firmly connected to the carrier element 46 by means of a piston rod of the actuator 54. The actuator 54 moves the first carrier element 46 together with the first container 4a to be tested in the movement direction B from the first arrangement downwards into the second arrangement. During this first relative movement, the first carrier element 46 and the first container 4a are moved at least partially through the sensor 26. The first carrier element 46 is thus lowerable.

The embodiment of FIG. 3c corresponds substantially to the embodiment according to FIG. 3b, with the difference that the first sensor 26 is arranged above the first carrier element 46 and the first container 4a in relation to the conveying plane 20 and the first carrier element 46 is raisable. The first sensor 26 is preferably arranged stationary, for example by being fastened on a machine frame of the testing apparatus 16 or of the packaging machine 2. The first sensor 26 may, however, also be movably mounted such that both the first carrier element 46 and the first sensor 26 are movable. The actuator 54 is again represented as a hydraulic or pneumatic cylinder, although it may be configured in any desired way. The actuator 54 is arranged below the first carrier element 46 and moves the first carrier element 46 together with the first container 4a to be tested from the first arrangement upwards into the second arrangement in movement direction B. During this first relative movement, the first carrier element 46 and the first container 4a are also moved at least partially through the sensor 26.

Figure 4:
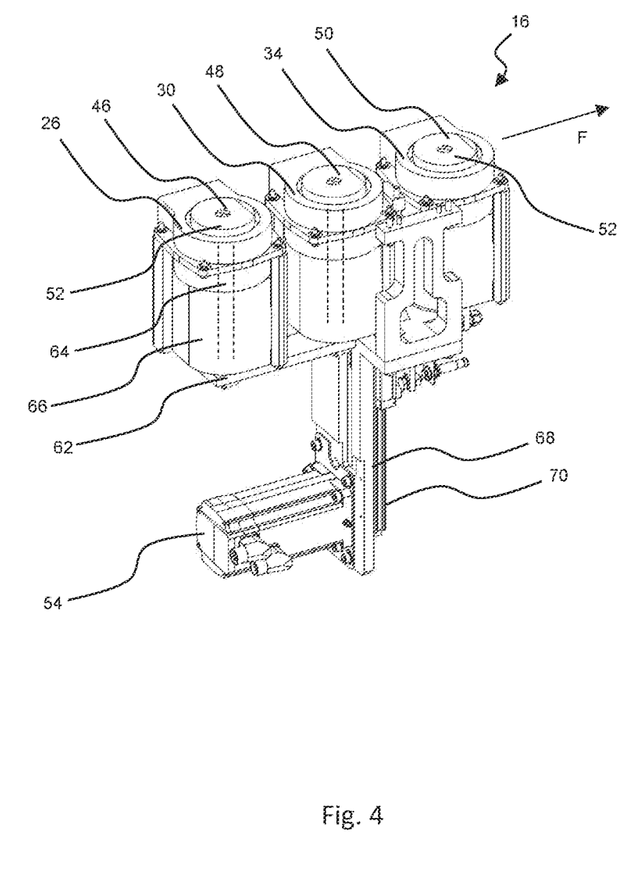
FIG. 4 shows a detail of the testing apparatus in a perspective view.

In FIG. 4, the plurality of sensors, here comprising the first, the second and the third sensor 26, 30, 34, is arranged successively in the conveying direction F. Each sensor 26, 30, 34 is assigned a carrier element 46, 48, 50 of the plurality of carrier elements 46, 48, 50, in order to respectively move one of the containers 4 to be tested through the respective sensor 26, 30, 34. In FIG. 4, the plurality of carrier elements 46, 48, 50 is arranged in such a way that the contact face 52 thereof lies within the conveying plane 20 in order to position the containers in the first arrangement relative to the plurality of sensors 26, 30, 34. The plurality of sensors 26, 30, 34 is arranged below the conveying plane 20, preferably stationary.

In the embodiment shown, the plurality of carrier elements 46, 48, 50 is lowerable in relation to the conveying plane 20. In order to move the carrier elements 46, 48, 50 synchronously, they are preferably connected to one another by means of a connecting element 62. For example, the connecting element 62 is configured in the form of a rail and is arranged parallel to the conveying direction F. Each carrier element 46, 48, 50 may be connected to the connecting element 62 by means of a supporting element 64, wherein the supporting element 64 is indicated by dashes in FIG. 4 and may be configured in the form of a rod, and may extend upwards from the connecting element 62 perpendicularly to the conveying direction F. Each supporting element 64 may be enclosed by a sleeve 66, which is preferably arranged stationary. In order to lower the plurality of carrier elements 46, 48, 50, the connecting element 62 is movably mounted on a linear guide 68, for example by means of a carriage. The linear guide 68 preferably extends substantially perpendicularly to the conveying plane 20. Here, the actuator 54 may be configured as a servomotor and may move the connecting element 68 to and fro along the linear guide 68, for example by means of a belt drive 70. Other types of drive may readily be envisaged.

In all embodiments, the first sensor 26, or the plurality of sensors 26, 30, 34, is preferably configured as a ring sensor which, in the second arrangement, fully encloses the respective container 4a, 4b, 4c to be tested in the circumferential direction of the container 4a, 4b, 4c. By way of example, it is explained with reference to FIG. 3c that the respective sensor 26 may then have an opening 60, which is preferably configured as a passage and into which the container 4a to be tested can be introduced. An inner circumference of the first sensor 26 corresponds to an inner circumference of this opening 60. An inner diameter I of the annular first sensor 26 corresponds to the diameter of the opening 60 and is greater than the diameter D of the first container 4a.

The invention claimed is:

1. A testing apparatus for a packaging machine for packaging ingestible products in containers, wherein the testing apparatus comprises:
   a conveyor device, which is configured to convey a plurality of containers in a clocked manner in a conveying plane in a conveying direction through the testing apparatus; and
   a plurality of sensors, wherein each sensor of the plurality of sensors is arranged in a testing region of the testing apparatus and is configured to detect foreign bodies in a container to be tested among the plurality of containers; and
   a plurality of carrier elements, wherein one container to be tested of the plurality of containers is received in a testing region by one carrier element of the plurality of carrier elements;
   wherein the plurality of sensors and/or the plurality of carrier elements of the testing apparatus, by which the containers to be tested are received in the testing region, is configured to be movable such that a relative movement between the plurality of sensors and the containers to be tested can be generated in a movement direction between a first arrangement and a second arrangement, the movement direction being orientated perpendicularly to the conveying plane; wherein, in the first arrangement, the plurality of sensors is arranged at a distance in the movement direction from the containers to be tested and, in the second arrangement, the plurality of sensors encloses the containers to be tested at least partially;
   wherein the sensors of the plurality of sensors are arranged successively in the conveying direction.

2. The testing apparatus of claim 1, wherein the sensors of the plurality of sensors are formed in an annular shape and, in the second arrangement, fully encloses the containers to be tested in a circumferential direction of the containers to be tested.

3. The testing apparatus of claim 1, wherein the plurality of carrier elements is configured to support the containers to be tested from below in the testing region and to be movable in the movement direction.

4. The testing apparatus of claim 3, wherein a contact face of the plurality of carrier elements, on which the containers to be tested are arranged, lies within the conveying plane in the first arrangement and does not lie within the conveying plane in the second arrangement.

5. The testing apparatus of claim 1, wherein the plurality of sensors is arranged below the conveying plane and the plurality of carrier elements is lowerable in relation to the conveying plane.

6. The testing apparatus of claim 1, wherein the carrier elements of the plurality of carrier elements are lowerable in relation to the conveying plane and are connected to one another such that they are movable synchronously.

7. The testing apparatus of claim 1, wherein at least two sensors of the plurality of sensors are operable with a different frequency.

8. A packaging machine for packaging ingestible products, in containers, wherein the packaging machine comprises:
   a feed unit, which is configured to feed a plurality of containers into the packaging machine;
   a filling unit, which is configured to fill the plurality of containers with the ingestible products;
   a closing unit, which is configured to close the plurality of containers respectively with a lid; and
   the testing apparatus of claim 1 for testing the plurality of containers for foreign bodies therein.

9. The packaging machine of claim 8, wherein the conveyor device of the testing apparatus is configured to convey the plurality of containers in a clocked manner through the filling unit, the closing unit and the testing apparatus.

10. The packaging machine of claim 8, wherein the testing apparatus is arranged ahead of the closing unit.

11. A method for testing containers for ingestible products by way of a testing apparatus comprising a conveyor device, a plurality of sensors for detecting foreign bodies and a plurality of carrier elements, wherein the method comprises the steps of:
   a) feeding a plurality of containers through the testing device in a clocked manner in a conveying plane in a conveying direction by means of the conveying device;
   b) arranging a containers to be tested of the plurality of containers in a testing region in a first arrangement relative to the plurality of sensors for detecting foreign bodies, the plurality of sensors being arranged at a distance in a movement direction from the containers to be tested in the first arrangement, the movement direction being orientated perpendicularly to the conveying plane, wherein one container to be tested of the plurality of containers is received by one carrier element of the plurality of carrier elements in the testing region, wherein the sensors of the plurality of sensors are arranged successively in the conveying direction;

c) generating a first relative movement between the containers to be tested and the plurality of sensors in the movement direction from the first arrangement into a second arrangement, in which the plurality of sensors at least partially encloses the containers to be tested;

d) detecting by means of the plurality of sensors whether a foreign body is contained in the containers to be tested, and thereby testing the containers;

e) generating a second relative movement between the tested containers and the plurality of sensors parallel to the movement direction back into the first arrangement; and f) feeding the tested containers from the testing region.

12. The method of claim 11, wherein step c) comprises:
lowering the containers to be tested in relation to the conveying plane, wherein the at plurality of sensors is arranged below the conveying plane.

13. The method of claim 11, wherein the sensitivity of the plurality of sensors is adjustable, and the method furthermore comprises:
adjusting the sensitivity of the plurality of sensors as a function of the ingestible products.

\* \* \* \* \*